United States Patent [19]
Hall et al.

[11] 3,714,856
[45] Feb. 6, 1973

[54] SIDING CUTTER

[75] Inventors: Marchand B. Hall, Olympia Fields; Irving Handler, Calumet City, both of Ill.; Calvin E. Kelly, Franklin Township, Allegheny County, Pa.

[73] Assignee: United States Steel Corporation

[22] Filed: Feb. 2, 1971

[21] Appl. No.: 111,964

[52] U.S. Cl. ............... 83/453, 83/467, 83/597, 83/605, 83/642
[51] Int. Cl. .............................................. B26d 7/16
[58] Field of Search ........ 83/451, 447, 453, 467, 450, 83/636, 597, 605, 642, 643, 609

[56] References Cited

UNITED STATES PATENTS

| | | | |
|---|---|---|---|
| 2,779,325 | 1/1957 | Beckham | 83/605 |
| 2,665,755 | 1/1954 | McCoy | 83/605 |
| 1,122,558 | 12/1914 | Vertunni et al. | 83/642 |

*Primary Examiner*—Andrew R. Juhasz
*Assistant Examiner*—W. Donald Bray
*Attorney*—Donald S. Ferito

[57] ABSTRACT

The cutter consists essentially of an upright supporting frame having a pair of fixed shear blades attached one to each side of the bottom of the frame and extending horizontally therefrom in spaced parallel relation in a plane below the upper portion of the frame which upper portion curves outwardly and horizontally. A pair of supporting plates mounted loosely one on each side of the frame support carry an upper shear blade for coaction with the fixed blades. A linkage means pivotally connects the supporting plates to the support frame and to an actuating handle in such a manner that the upper shear blade moves in a path in a plane from the upper portion of the support frame to a point between the fixed shear blades at a constant angle relative to the surface of the siding when the handle is manipulated. The upper surfaces of the fixed shear blades are formed with fixed stop members. Interchangeable auxiliary fixed blades and stop members are provided to hold and shear a length of siding. The portion of the upstanding frame immediately adjacent to and immediately above the ends of the fixed shear blades attached to the frame is formed with a thickness less than the distance between the fixed shear blades so that the cutter is, in effect, a throatless cutter for the purpose of facilitating making long cuts in siding.

10 Claims, 4 Drawing Figures

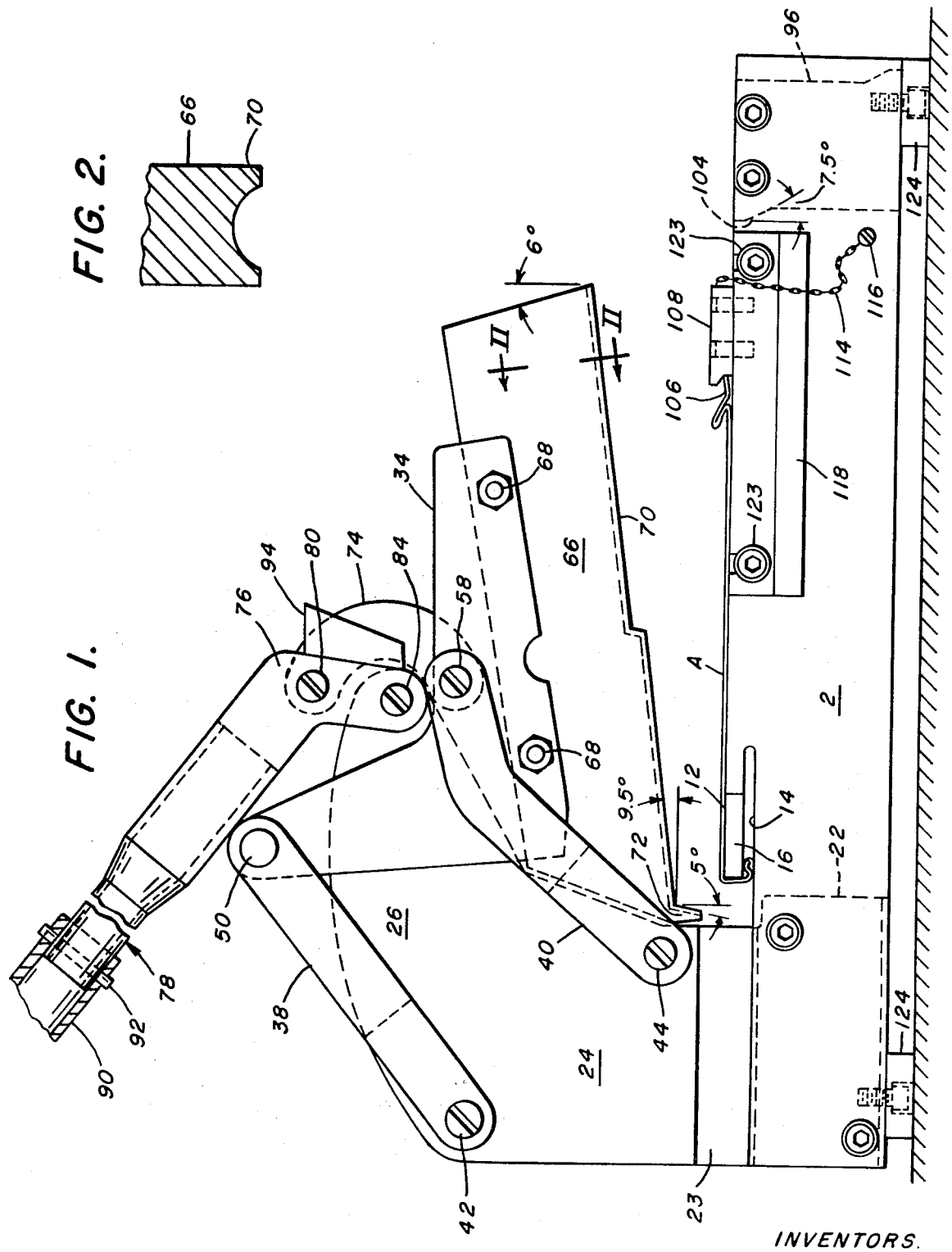

INVENTORS.
MARCHAND B. HALL,
IRVING HANDLER &
CALVIN E. KELLY
By Donald S. Ferito
Attorney

SIDING CUTTER

BACKGROUND OF THE INVENTION

The invention relates particularly to apparatus for cutting metal siding that is applied as facing on the outer walls of buildings. The siding is usually supplied in the form of strips of metal having one edge formed with a butt flange and the other edge formed with a coacting locking configuration so that a plurality of courses of siding may be interlocked during application. The siding strips are generally either approximately 8 inches wide or approximately 10 inches wide, the latter being provided with a stepped portion intermediate their width so as to have the appearance of two courses of siding when installed.

During the installation of such siding, it is necessary to cut the strips, which are usually 12 feet long, to the proper lengths and frequently to cut the ends of some of the siding strips at various angles or to cut notches in the siding so as to properly fit the siding around windows, door frames, etc.

Prior to our invention, various types of cutting tools, including shears, were available for cutting siding strips. However, these cutting tools were relatively expensive, unduly heavy, limited in flexibility, or required an expensive power source for operation. For example, most siding cutters prior to our invention required large housings to accommodate the longest length of cut, which made them impractical for field application use and also too expensive for the average field contractor to use at a warehouse or other location removed from the installation site. Power shears which were sufficiently light in weight to be portable were slow in operation and a supply of power required for their operation was not always available. Other prior cutters for siding were limited in the length of cut they could make so that they could not provide short length cutouts normally required for residential buildings such as around windows and doors.

It is, accordingly, the primary object of our invention to provide a portable, light-weight cutter for metal siding which can make clean, distortion-free cuts with a minimum of manual effort being exerted.

Another object of the invention is to provide a cutter which can make a cut of unlimited length.

Still another object of the invention is to provide a siding cutter which is capable of making cuts on both the straight horizontal type siding as well as the stepped type siding through the use of manual force alone.

It is a more specialized object of our invention to provide apparatus for cutting siding which includes a pair of fixed elongated shear blades and a movable shear blade mounted for coaction with the fixed blades, means for supporting the movable shear blade and linkage means for rotating the movable blade-supporting means about a pivot so that it cooperates with the fixed shear blades in an efficient cutting action.

As a corollary to the object immediately above, it is a further specialized object of the invention to provide a cutter in which the means for rotating the movable shear blade about its pivot includes two sets of pivot links and a rotatable toggle link, means for rotating the toggle link with one end of the toggle link attached to the movable blade carrier and the other end of the toggle link attached to a crank handle.

As a further corollary to the objects above, it is a further object of our invention to provide a cutter in which a means for preventing distortion of the siding during cutting is provided by interchangeable guide means adapted to coact with stops on the fixed shear blades to render it suitable for cutting various types of siding.

As a further corollary to the objects above, it is another object of our invention to provide a cutter in which the support for the movable blade carrier is relieved at a portion intermediate its height to permit operation of the cutter as a throatless unit.

As a further corollary to the objects stated above, it is a further object of our invention to provide a notching block in the cutter between and supported by the fixed shear blades.

As a further corollary to the above objects, it is another object of our invention to provide a cutter in which the movable shear blade is hollow ground on its cutting edge along its entire length.

These and other objects will become more apparent after referring to the following specification and attached drawings, in which:

BRIEF DESCRIPTION OF THE DRAWING

FIG. 1 is a side elevational view of a preferred embodiment of the cutter of our invention;

FIG. 2 is a cross-sectional view taken substantially along the line II—II of FIG. 1;

DESCRIPTION OF THE PREFERRED EMBODIMENTS

Figure 3:
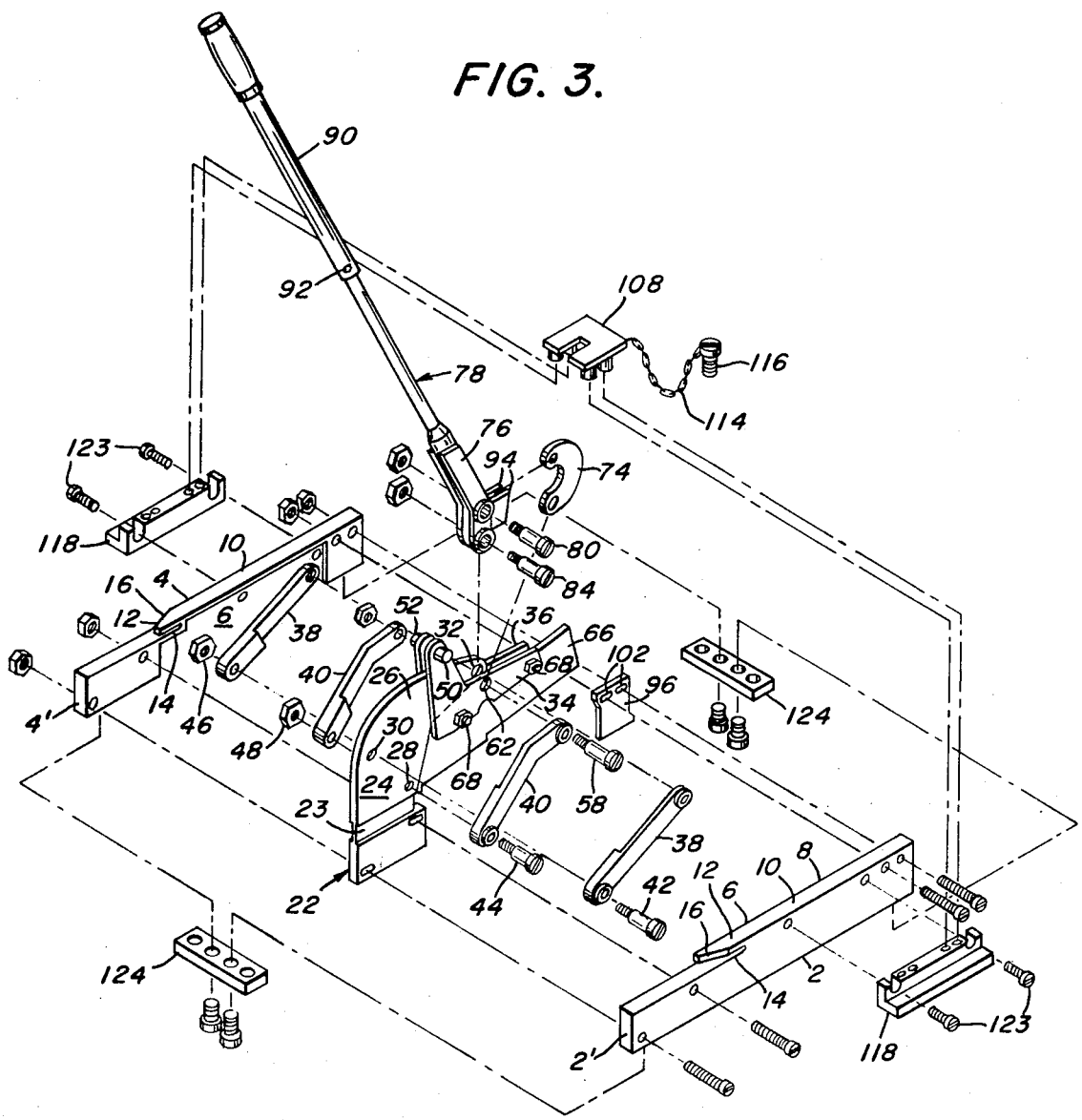
FIG. 3 is an exploded substantially schematic view of the preferred embodiment of the invention.

Referring more particularly to the drawing, reference numerals 2 and 4 designate the two fixed shear blades of the cutter of the invention which serve also as the main frame of the cutter. For cutting conventional siding, the fixed shear blades are preferably made from two ¾-inch thick hardened and ground steel plates. The rearward ends 2' and 4' of the blades 2 and 4, respectively, are machined to provide on their upper surfaces ⅜ inch thick ears 12 which are undercut so as to form a narrow slot 14 on each blade. The outside of the ears 12 are formed with tapered surfaces 16.

The fixed shear blades 2 and 4 are secured at their rearward ends with nuts and bolts to an upright support frame, designated generally by reference numeral 22. The support frame 22 is a curved plate machined on both sides to about a ⅜ inch thickness. Thus, the bottom blades 2 and 4 are maintained three-eights inch apart. The support frame 22 is provided with an intermediate area 23 of reduced thickness, slightly less than three-eights inch, immediately above and adjacent to the portion of the frame to which the fixed blades are attached. The purpose of this reduced thickness area will become apparent. The frame 22 is formed with a vertical portion 24 and a curved, substantially horizontal portion 26 extending from the top of the vertical portion 24. The frame 22 is provided with three pivot holes 28, 30 and 32, as best shown in FIG. 3. A pair of substantially L-shaped clamp plates 34 and 36 are disposed loosely one on each side of the curved portion 26 of frame 22 with the short leg of each clamp extending upwardly of the frame 22 and the long leg of each clamp projecting beyond the end of the curved portion 26.

Two pairs of links 38 and 40 are pivotally connected at one end to the frame 22 by means of shoulder bolts 42 and 44, respectively and lock nuts 46 and 48, respectively. Shoulder bolt 42 passes through bushings in the ends of the links 38 and the pivot hold 30 in the frame 22. Bolt 44 passes through bushings in the ends of links 40 and pivot hold 28. The opposite ends of the links 38 are pivotally attached to pins 50 and 52 which project from opposite sides of the clamp plates 34 and 36, respectively, as best shown in FIG. 3. The links 38 are secured to the pins 50 and 52 by dowel pins (not shown).

The opposite ends of links 40 are pivotally attached to the clamp plates 34 and 36 by means of a shoulder bolt 58 which passes through the links 40 and aligned holes 62 in the clamp plates 34 and 36. Suitable bushings may be provided in the holes 62. The shoulder bolt 58 is secured by means of a lock nut threaded on its end.

Links 38 and 40 thus move on a common radius and constrain clamp plates 34 and 36 to move in an approximately straight path in a single plane at a slight angle toward the bottom shear blades 2 and 4. The links 38 and 40 form a substantially parallelogram linkage.

An upper shear blade 66 is rigidly attached between the two clamp plates 34 and 36 by means of two bolts-and-lock-nuts 68. As best shown in FIG. 1, the cutting surface 70 of the upper shear blade 66 has a contour generally similar to the contour of the stepped type siding B so that when it is lowered by means of links 38 and 40 it contacts the horizontal surface of the siding at an angle of approximately 7.0° to 11.0°, preferably 9.5°, relative thereto and maintains this angular relationship substantially constantly during the cut. The contour of the upper shear blade is also suitable for the horizontal flat type siding. The rearward edge of the blade 66 is provided with a dependent flange 72 which is tapered so that it contacts the vertical surfaces of the siding at an angle of preferably 5°, as best shown in FIG. 1. Thus, the movable blade 66 makes contact with the siding always at a bias. The opposite end of the blade 66 is biased from the vertical at approximately 6°.

As best shown in FIG. 2, the cutting edge 70 of the blade 66 may be formed with a concave or hollow ground surface along its length in order to concentrate the cutting force at the edges of the cutting surface of the blade 66 and minimize the loss of cutting energy to bending of the siding during the cut.

A toggle link 74 is pivotally attached by one end to the bolt 58 between the plate 34 and 36. The opposite end of the link 74 is attached to the clevis end 76 of a handle 78 by lock-nut-and-bolt means 80. The lower part of the clevis end 76 is attached to the frame 22 at the pivot hold 32 by lock-nut-and-bolt means 84.

The combination of the toggle link 74, which is attached to the handle 78 at one end and to the bolt 58 at its other end, and the parallelogram linkage formed by the links 38 and 40 causes the movable shear blade to approach and cut the siding at a constantly held angle to the surface thereof. This results in the cut being made progressively from the butt flange end to the locking edge of the siding or from left to right as viewed in FIG. 1, with the movable shear blade maintaining substantially the same angular relationship (7.0° to 11.0°) with the horizontal surface of the siding during the entire cut. The combination of the toggle linkage and the substantially parallelogram linkage also provides greater handle force magnification and, therefore, less effort is required at the time of cutting the locking edge of the siding where three thicknesses of cutting must be cut due to the folded configuration of the siding at its locking edge 106.

The lower end of the handle 78 is welded or otherwise fixedly attached to the clevis end 76. A pipe extension 90 may be removably attached to the end of the handle 78 by a dowel pin 92. The pipe extension provides maximum leverage while still affording portability by virtue of the fact that it can be removed when the cutter is to be moved from one location to another. Two stop bars 94 are fixedly mounted on and project forwardly of the clevis end 76, as best shown in FIG. 3.

The ends of the fixed shear blades 2 and 4 remote from the support frame 22 are attached to and separated by a flat notching black 96 by nut and bolt means. Notching black 96, which is of the same thickness as the bottom portion of frame 22, serves to precisely space the forward ends of the blades 2 and 4 similarly to frame 22. The notching block 96 is adjustably positioned by means of slotted openings 102, as best shown in FIG. 3, to allow for adjustment to obtain suitable clearance for upper shear blade 66 and also to provide a shearing action of the blade 66 on the siding when it is desired to cut a notch in the locking edge of the siding. An undercut angle of preferably 7.5° is provided on the upper inner edge of the notching block 96 to provide the necessary rake when it is desired to form a notch in the siding. The hollow ground cutting edge surface of the movable blade 66 mating with the inner upper edge 104 of the notching block 96 provides a unique shearing action by permitting the shearing to go " around" a 90° angle without tearing or bending of the metal. This feature also permits initial notching of the locking edge of the siding for easier access of tin snips. It will be understood that the cutting surface of movable blade 66 need not be hollow ground to effect siding cutting. If the blade 66 is not hollow ground, the inner upper edge 104 of the notching block 96 may be provided with a concave portion (not shown) intermediate its sides to achieve the unique shearing action described immediately above.

A rectangular siding-stop block 108 is removably attached to the forward ends of the blades 2 and 4 by means of dowel pins which project from the under surface of the block 108 and fit removably into suitable holes drilled into the upper surfaces of the auxiliary shear and stop members 118. As best shown in FIG. 1, the block 108 prevents the butt flange edge of siding A from distorting when the locking edge is being sheared. Block 108 may be suitably secured to one of the fixed blades 2 or 4 by a suitable length of chain 114 and screw 116 to prevent misplacement of the block.

Figure 4:
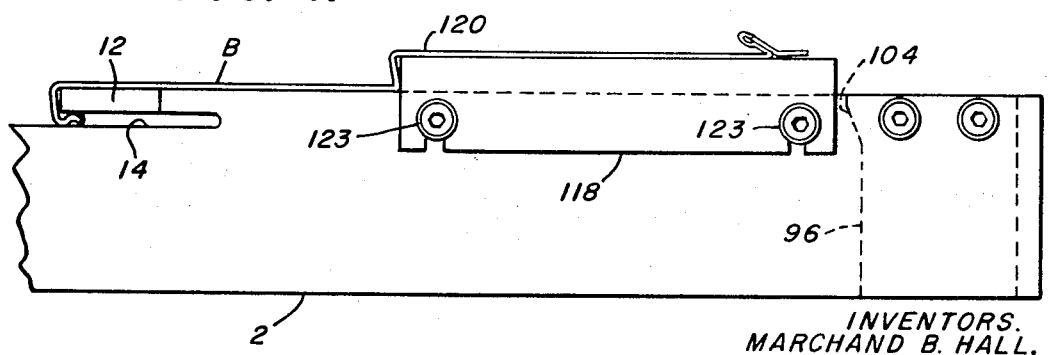
FIG. 4 is a partial elevational view showing the preferred embodiment of the invention adapted to shear stepped siding.

Two L-shaped bars 118 are provided to support the stepped portion 120 when a stepped type siding B, as best shown in FIG. 4, is being cut, and also to coact with the movable shear blade 66 as auxiliary fixed shear blades with blades 2 and 4 during cutting of the stepped siding. The bars 118 are contoured to fully support the stepped portion of siding B, and are attached one to each of the blades 2 and 4 by cap bolts 123 which project through slots in the L-shaped bars and are threaded into suitable holes in the blades 2 and 4. When the bars 118 are not in use, they are mounted in a reverse position, as best shown in FIG. 1, to the fixed blades 2 and 4.

In order that the cutter remain steady when being used, a supporting plate 124 may be bolted to the underside of each end of the pair of fixed blades 2 and 4. The support plates also serve to maintain the cutter in a raised position so as to facilitate removal of scrap.

In operation, for shearing flat horizontal siding A at a right angle to its length, the handle 78 is moved to its most rearward position, as shown in FIG. 1, which raises the upper blade 66 to its highest point. The siding A is then placed on the blades 2 and 4 so that it is snug between the ears 12 and the stop block 108. The handle 78 is then moved forward and downward, which causes the blade 66 to be lowered and shear a ⅜ inch wide strip out of the siding severing it into two parts. Due to the linkage arrangement of the invention, when the handle 78 is moved downward, the movable shear blade 66 approaches the horizontal surface of the siding at an angle of 7° to 11°, preferably 9.5°, so that the butt flange end (as viewed in FIG. 1) of the siding is contacted first by the blade 66, and, with the blade constantly maintaining substantially the same angular relationship to the siding surface, the cut is made progressively toward the locking edge of the siding as the handle 78 is continued to be moved downwardly. This arrangement insures a clean cut with no distortion of the siding with a minimum of manual effort being required during the cutting operation. During the cutting of the locking edge portion 106 of the siding A, the handle 78 is in approximately a horizontal position. This is another advantageous feature since the operator can use his body weight to add to the already high leverage which the linkage arrangement provides.

For making a cut at any angle of the flat horizontal siding A the right angle cut is first made as explained above. The siding is then moved to the desired angle relative to the movable blade 66, and the handle 78 is operated in the same manner as is done when making the right angle cut. In making the angular cut, the movable blade 66 removes a ⅜ inch wide strip completely from the siding A when the end of the movable blade 66 passes by the notching block 96. The siding A can then be moved forward being guided by the reduced thickness area 23 of the support frame 22, and another similar cut is made. The operation may be continued until any desired length of cut is made. Taking advantage of the throatless feature of the cutter of the invention, a long cut can be made with a small size shear, thus maintaining portability and nominal tool cost.

To cut the stepped siding B at a right angle, the stop block 108 is removed and the bars 118 are reversed and attached to the upper portions of the blades 2 and 4. The stepped siding B is placed in position with its butt flange edge engaged by the ears 12 and the stepped portion 120 of the siding B supported by the bars 118. The cutting operation is similar to that employed for the right angle cuts of the horizontal flat siding A.

In cutting either flat horizontal type siding A or stepped typed siding B, over-travel of the movable shear blade 66 is prevented by the stop bars 94 contacting the clamp plates 34 and 36 as the handle 78 is moved downwardly. Although we have shown but two embodiments of our invention, other adaptations and modifications may be made without departing from the scope of the following claims.

We claim:

1. Apparatus for cutting siding having a butt flange along one edge which comprises an upright support frame including a substantially vertical portion and a portion extending generally horizontally from the upper part of said vertical portion, a pair of fixed elongated shear blades attached at one end one on each side of the bottom part of said vertical portion and extending therefrom in spaced parallel relation to each other in a plane below said horizontally extending portion of said frame, a lever handle pivotally connected at one end to the free end of the horizontal portion of said frame, a movable shear blade, linkage means pivotally linking said movable shear blade and said horizontal portion of said frame for movement in a path in a plane extending from said horizontal portion downwardly to between said fixed shear blades at an angle of approximately 7.0° to 11.0° relative to the surface of said siding, a link connecting said handle to said linkage means whereby movement of said handle effects movement of said movable shear blade along said path with said movable shear blade maintained constantly at an angle of approximately 7.0° to 11.0° relative to the surface of said siding, a tapered undercut ear formed on the upper surface of each of said fixed shear blades intermediate the end thereof for receiving the butt flange of said siding and providing a guide and rest for said siding.

2. Apparatus as defined by claim 1 including a stop on the upper surfaces of said fixed shear blades remote from said undercut ear for engaging a surface of said siding remote from said butt flange to thereby immobilize said siding while being cut.

3. Apparatus as defined by claim 1 in which the vertical portion of said frame immediately above said fixed shear blades is of a thickness less than the distance between said fixed shear blades.

4. Apparatus as defined by claim 1 including a notching-spacer block disposed between the end of said fixed shear blades remote from said frame, the thickness of said notching-spacer block being substantially the same as the vertical portion of said frame disposed between said fixed shear blades, the upper inner edge of said notching-spacer block being angularly shaped to provide a suitable rake angle to cooperate with said movable shear blade in its cutting action.

5. Apparatus as defined by claim 4 in which the cutting surface of said movable shear blade is hollow ground along its length.

6. Apparatus as defined by claim 1 in which the cutting edge of said movable shear blade is contoured along its length similarly to the contour of said siding including a depending abutment at one end for engaging the butt flange of said siding, the flange-engaging side of said abutment being tapered diminishing in thickness toward its outer end, the opposite end of said movable shear blade being tapered inwardly from the vertical, and the cutting edge of said movable shear between said abutment and said opposite end being tapered so that it contacts the horizontal surface of said siding at a suitable angle.

7. Apparatus as defined by claim 1 including a support plate attached to the underside and spanning the space between said pair of fixed shear blades adjacent each end thereof.

8. Apparatus for cutting siding having a butt flange along one edge, a locking configuration along its opposing edge, and a stepped portion intermediate said edges which comprises an upright support frame including a substantially vertical portion and a portion extending generally horizontally from the upper part of said vertical portion, a pair of fixed elongated shear blades attached by one end one on each side of the bottom part of said vertical portion and extending therefrom in spaced parallel relation to each other in a plane below said horizontally extending end to the free end of said horizontal portion of said frame, a movable shear blade, means pivotally linking said movable shear blade and said horizontal portion of said frame for movement in a path in a plane extending from said horizontal portion downwardly to between said fixed shear blades at an angle of approximately 7.0° to 11.0° relative to the surface of said siding, a link connecting said handle to said linkage means whereby movement of said handle effects movement of said movable shear blade along said path with said movable shear blade maintained constantly at an angle of approximately c 7.0° to 11.0° relative to the surface of said siding, a tapered undercut ear formed on the upper surface of each of said fixed shear blades intermediate the end thereof for receiving the butt flange of said siding and providing a guide and rest for said siding, an auxiliary rigid shear blade removably disposed on the upper surface of each of said pair of said fixed shear blades remote from said undercut ear engaging the stepped portion of said siding to thereby support and immobilize said siding while being cut, said movable shear blade coacting with said first-mentioned fixed shear blades and said auxiliary rigid shear blades to cut said siding.

9. Apparatus as defined by claim 8 including a notching-spacer block disposed between the ends of said pair of fixed shear blades remote from said frame, the thickness of said notching-spacer block being substantially the same as the vertical portion of said frame disposed between said fixed shear blades, the upper, edge of said notching-spacer block being angularly shaped to provide a suitable rake angle to cooperate with said movable shear blade in its cutting action, the upper edge of said notching-spacer block being formed with a concave portion intermediate its sides.

10. Apparatus for cutting siding having a butt flange along with edge and a locking configuration along its opposite edge, which comprises an upright support frame including a substantially vertical portion and a portion extending generally horizontally from the upper part of said vertical portion, a pair of fixed elongated shear blades attached by one end one on each side of the bottom part of said vertical portion and extending therefrom in spaced parallel relation to each other in a plane below said horizontally extending portion of said frame, a lever handle pivotally connected at one end to the free end of said horizontal portion of said frame, a movable shear blade, linkage means pivotally linking said movable shear blade and said horizontal portion of said frame for movement in a path in a plane extending from said horizontal portion downwardly to between said fixed shear blades at an angle of approximately 7.0° to 11.0° relative to the surface of said siding, a link connecting handle to said linkage means whereby movement of said handle effects movement of said movable shear blade along said path with said movable shear blade maintained constantly at an angle of approximately 7.0° to 11.0° relative to the surface of said siding, a tapered undercut ear formed on the upper surface of each of said fixed shear blades intermediate the end thereof for receiving the butt flange of said siding and providing a guide and rest for said siding, a stop removably disposed on the upper surface of each of said fixed shear blades remote from said undercut ear for engaging the locking configurated edge of said siding to thereby immobilize said siding while being cut.

* * * * *